(12) United States Patent
Yao et al.

(10) Patent No.: US 7,775,668 B2
(45) Date of Patent: Aug. 17, 2010

(54) COLOR-MIXING LASER MODULE AND PROJECTORS USING THE SAME

(75) Inventors: Po-Hung Yao, Kaohsiung County (TW); Cheng-Huan Chen, Taoyuan County (TW); Ya-Yu Nieh, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 411 days.

(21) Appl. No.: 11/834,829

(22) Filed: Aug. 7, 2007

(65) Prior Publication Data

US 2008/0252853 A1 Oct. 16, 2008

(30) Foreign Application Priority Data

Apr. 10, 2007 (TW) .............................. 96112568 A

(51) Int. Cl.
*G03B 21/00* (2006.01)

(52) U.S. Cl. .............................. 353/31; 353/30; 353/33; 353/52; 353/122; 359/563; 359/565; 359/566; 359/558; 359/579; 359/707; 359/634; 359/622; 372/50.121; 372/42; 372/68; 372/102; 372/103; 372/108

(58) Field of Classification Search ............... 353/20, 353/30, 31, 33, 52, 122; 359/563, 565, 566, 359/558, 579, 707, 634, 622; 372/42, 50.121, 372/68, 101, 102, 103, 108
See application file for complete search history.

(56) References Cited

U.S. PATENT DOCUMENTS

| 5,658,060 A | 8/1997 | Dove |
| 6,582,081 B2 * | 6/2003 | Seo et al. ..................... 353/20 |
| 6,644,814 B2 * | 11/2003 | Ogawa et al. ................. 353/31 |
| 2007/0024595 A1 | 2/2007 | Baker et al. |

FOREIGN PATENT DOCUMENTS

| TW | 548427 | 8/2003 |
| TW | 577235 | 2/2004 |
| TW | 579451 | 3/2004 |
| TW | 251679 | 3/2006 |

* cited by examiner

*Primary Examiner*—Georgia Y Epps
*Assistant Examiner*—Sultan Chowdhury
(74) *Attorney, Agent, or Firm*—WPAT, PC; Justin King

(57) ABSTRACT

A color-mixing laser module is disclosed, which is comprised of a laser unit capable of emitting red, blue and green laser beams; a beam combiner, for receiving and converging the laser beams emitted from the laser unit and then directing the converged laser light to illuminate on a light pattern adjusting unit; and the light pattern adjusting unit, capable of receiving the converged laser light from the beam combiner for adjusting the pattern of the same.

31 Claims, 5 Drawing Sheets

COLOR-MIXING LASER MODULE AND PROJECTORS USING THE SAME

FIELD OF THE INVENTION

The present invention relates to a color-mixing laser module, and more particularly, to a color-mixing laser module capable of adjusting the laser light emitting therefrom by the use of a light pattern adjusting unit.

BACKGROUND OF THE INVENTION

Conventional projectors have a number of difficulties and limitations. One of which is that all projection apparatus require sophisticated and complex optical engines and electronic components that are in-built into the apparatus. Frequently the complex and massive optical engines contain many optical components, such as illumination tubes, reflectors, integrators, lens set, and light pipes, etc., that are required to cooperate in a precise manner so as to enable the projection apparatus to work properly. However, the complexity of those conventional optical engines not only may cause assembly difficulty, but also it may be the cause of failing to achieve a compact and portable projector.

Another limitation of conventional projectors is that they are required to use color wheel and several polarizers, despite the use of foregoing components not only may reduce light utilization efficiency and color purity, but also may cause the projector to have more complicated optical pathway and thus indirectly increase the cost of assembly. Some efforts had been invested into developing projectors producing bright, high-quality, color images that are also compact and portable, such as those disclosed in U.S. Pat. Nos. 6,767,100 and 6,624,949. However, the color saturation of both of the two U.S. patented projecting apparatuses is still being limited by their using of traditional light sources and color wheel. Although it is possible to use light emitting diodes for replacing such traditional light sources and thus enhancing color purity, the use of polarizers for achieving required polarization is still unavoidable that may reduce light utilization efficiency. Therefore, as the conventional projection apparatuses require optical components, such as color wheel, light collimating lens, fly-eye lens array, and heat-dissipating fan, etc., they are usually built to be a massive device that are not portable.

Therefore, an alternative optical architecture is desired that substantially decreases the size and weight of the projection apparatus as compared with conventional projection apparatuses and significantly enhances color quality.

SUMMARY OF THE INVENTION

The object of the present invention is to provide a color-mixing laser module for enhancing the uniformity of beaming light by the use of light pattern adjusting unit with matching beam combiner or prism.

In an exemplary embodiment of the invention, a color-mixing laser module is provided, which comprises: a laser unit, capable of emitting red, blue and green laser beams; a beam combiner, for receiving and converging laser beams emitted from the laser unit and then redirecting the converged laser light to illuminate therefrom; and a light pattern adjusting unit, having a first optical surface, a second optical surface for receiving the laser beams emitting from the beam combiner, and an array of microstructures are formed on the first optical surface; wherein each microstructure is a pillar with arc-like profile for forming a curved surface at the top thereof, provided for allowing the laser beams emitting from the beam combiner to pass therethrough.

Further scope of applicability of the present application will become more apparent from the detailed description given hereinafter. However, it should be understood that the detailed description and specific examples, while indicating several embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
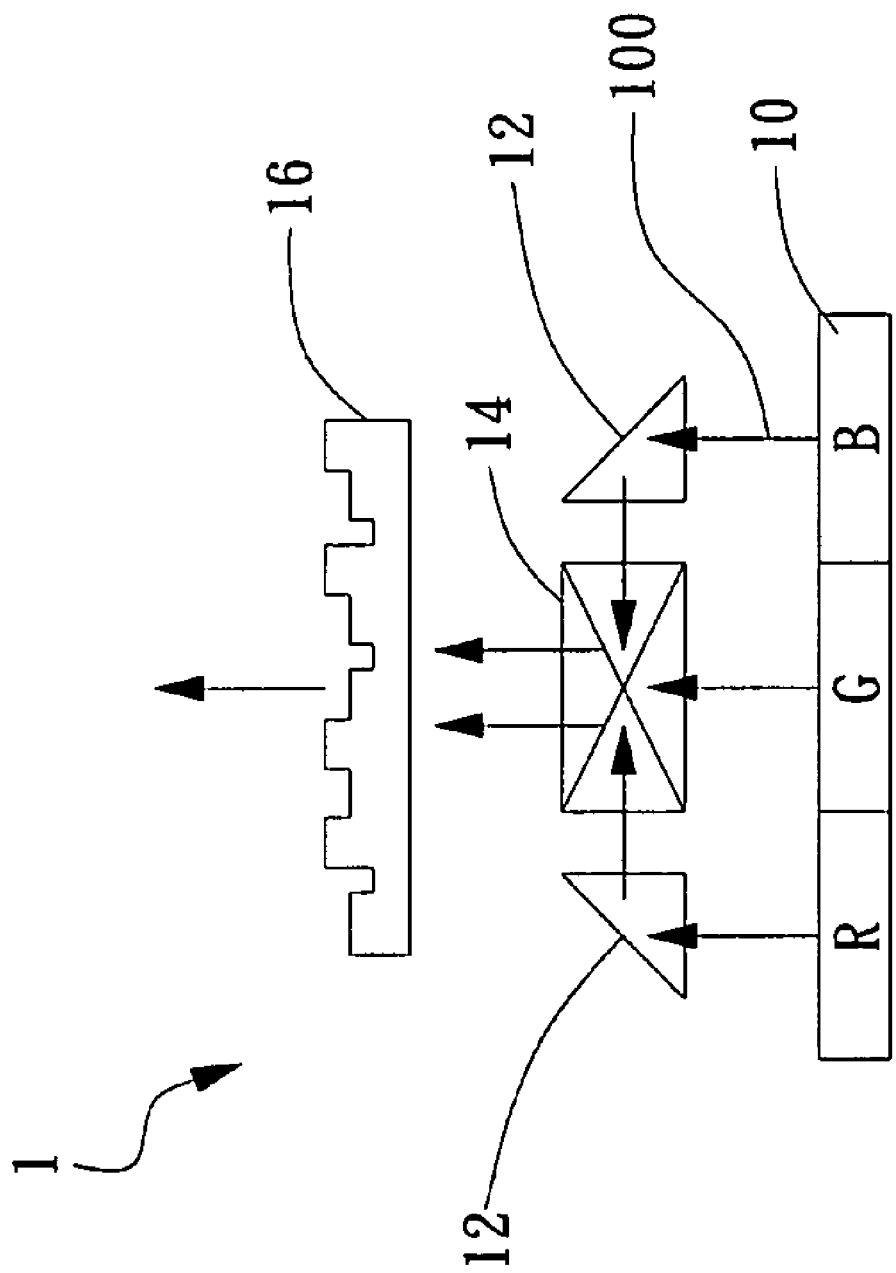
FIG. 1 is a schematic diagram showing a color-mixing laser module according to an exemplary embodiment of the invention.
Figure 2A:
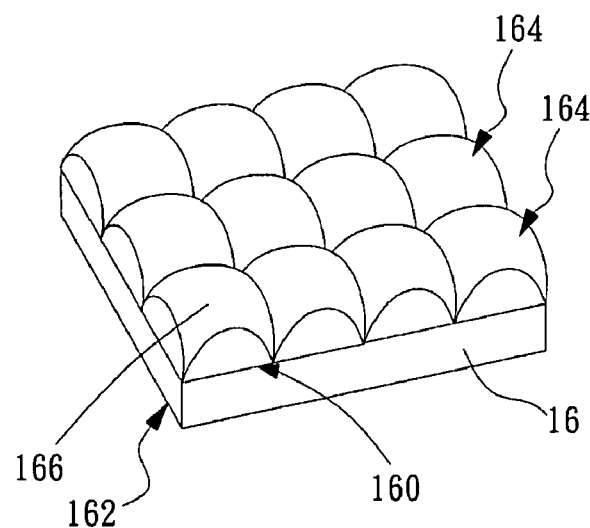
FIG. 2A shows a light pattern adjusting unit capable of being used in a color-mixing laser according to an exemplary embodiment of the invention.

Please refer to FIG. 1, which is a schematic diagram showing a color-mixing laser module according to an exemplary embodiment of the invention. The color-mixing laser module 1 of FIG. 1 is comprised of: a laser unit 10; a beam deflector 12; a beam combiner 14; and a light pattern adjusting unit 16; wherein, the laser unit 10 is capable of emitting red (R), blue (B) and green (G) laser beams 100; the beam deflector 12 is disposed at a position for enabling the same to guide the laser beams 100 of the laser unit 10 toward the beam combiner 14; the beam combiner 14 is used for receiving and converging laser beams 100 and then redirecting the converged laser light to illuminate toward the light pattern adjusting unit 16; and the light pattern adjusting unit 16 is used for receiving the laser beams 100 from the beam combiner 14 while scattering the same for improving light uniformity;

Please refer to FIG. 2A, which shows a light pattern adjusting unit capable of being used in a color-mixing laser according to an exemplary embodiment of the invention. The light pattern adjusting unit 16 of FIG. 2A is comprised of: a first optical surface 160; a second optical surface 162; and an array of microstructures 164 formed on the first optical surface 160. The second optical surface 164 is orientated for enabling the same to receive the laser beams 100 emitted from the beam combiner 14, so that it is referred as the incident surface of the laser beams 100. Each microstructure 164 is a pillar with arc-like profile for forming a curved surface 166 at the top of each microstructure 164, by which the laser beams incident thereon is scattered and uniformly diffused with respect to the principle of diffraction. The structure of the light pattern adjusting unit 16 is the same as that disclosed in TW Pat. Publ. No. 200700771, and thus is not described further herein.

Figure 2B:
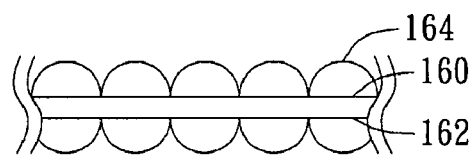
FIG. 2B shows another light pattern adjusting unit capable of being used in a color-mixing laser according to an exemplary embodiment of the invention.
Figure 2C:
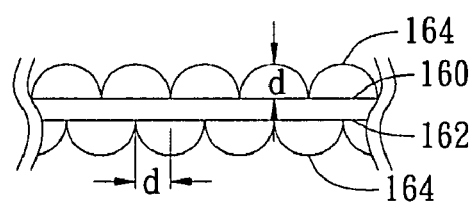
FIG. 2C shows yet another light pattern adjusting unit capable of being used in a color-mixing laser according to an exemplary embodiment of the invention.

Please refer to FIG. 2B and FIG. 2C, which show two different light pattern adjusting units capable of being used in a color-mixing laser according to exemplary embodiments of the invention. In FIG. 2B, arrays of microstructures 164 are formed on the first and the second optical surfaces 160, 162 simultaneously in a symmetric manner. In FIG. 2C, the center of the array of microstructures 164 on the first optical surface 160 is staggered from the center of the array of microstructures 164 on the second optical surface 162 horizontally by a specific horizontal distance d while defining the specific horizontal distance d to be the curvature radius of the microstructure 164.

Figure 2D:
FIG. 2D shows further another light pattern adjusting unit capable of being used in a color-mixing laser according to an exemplary embodiment of the invention.

It is noted that the light pattern adjusting unit 16 is not limited by those shown in the embodiments of FIGS. 2A, 2B, and 2C, that any variations fitted to the defining of the diffraction principle can be adopted in the invention. For instance, the microstructure shown in FIG. 2D is shaped with square profile, however, it is not limited thereby and thus can be of any other shapes, such as rectangle, triangle, or hexagon, and so on.

Figure 3:
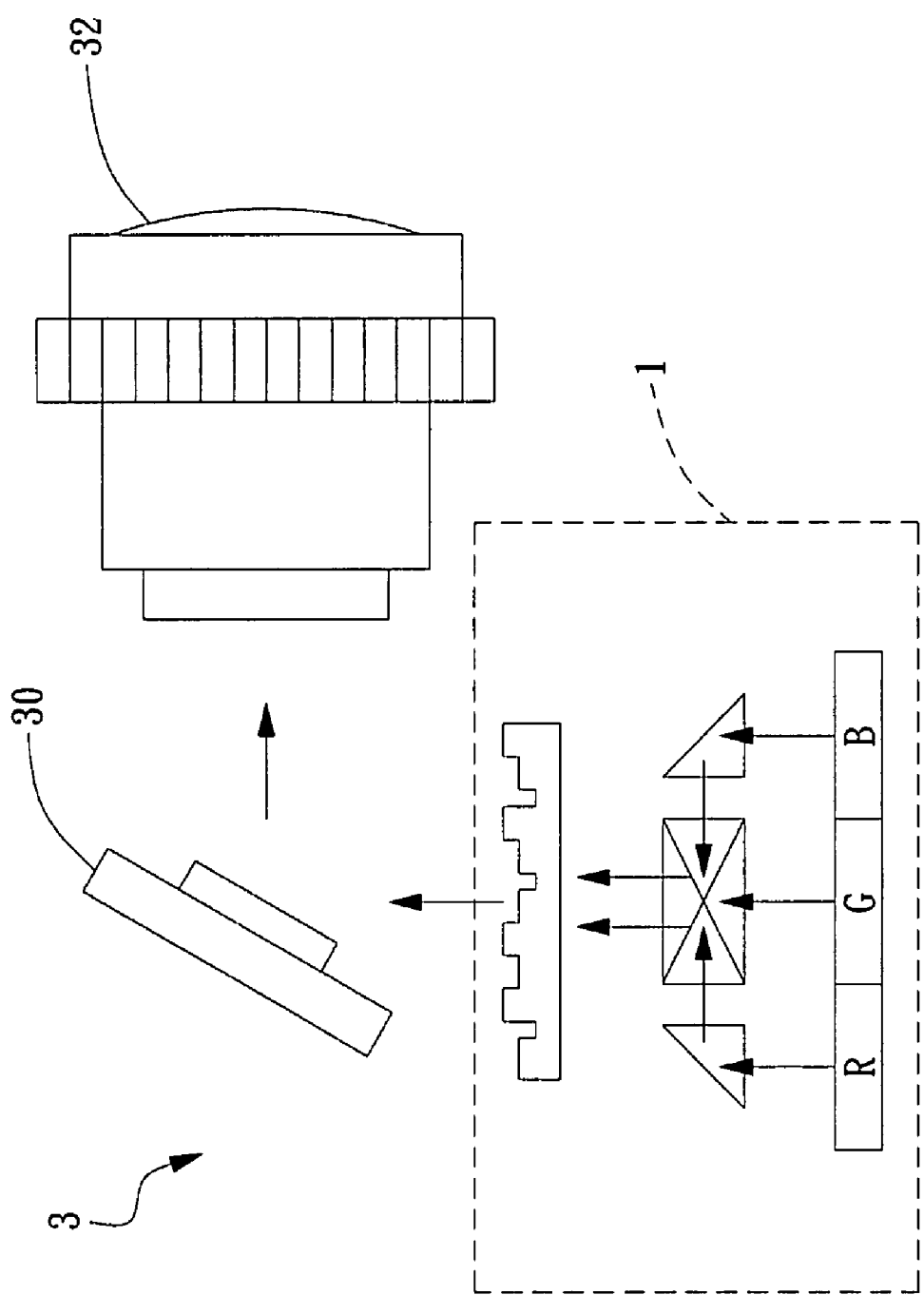
FIG. 3 shows a digital light processing (DLP) projection apparatus adopting a color-mixing laser module of the invention.

Please refer to FIG. 3, which shows a digital light processing (DLP) projection apparatus adopting a color-mixing laser module of the invention. The DLP projection apparatus 3 shown in FIG. 3 is structured similar to conventional DLP projector that is also structured with a digital micromirror device (DMD) 30 and a projection lens set 32, but is different in that, instead of conventional light bulb, the DLP projection apparatus 3 uses the aforesaid color-mixing laser module 1 as its light source. In which, the digital micromirror device (DMD) 30 receives and converts the laser beams of the color-mixing laser module 1 into image signals which is then being amplified by the projection lens set 32 and then projected onto a surface or a screen. It is noted that the conventional devices, such as color wheel, light collimating lens, fly-eye lens array, and heat-dissipating fan, etc., are no longer required in the DLP projection apparatus 3.

Figure 4:
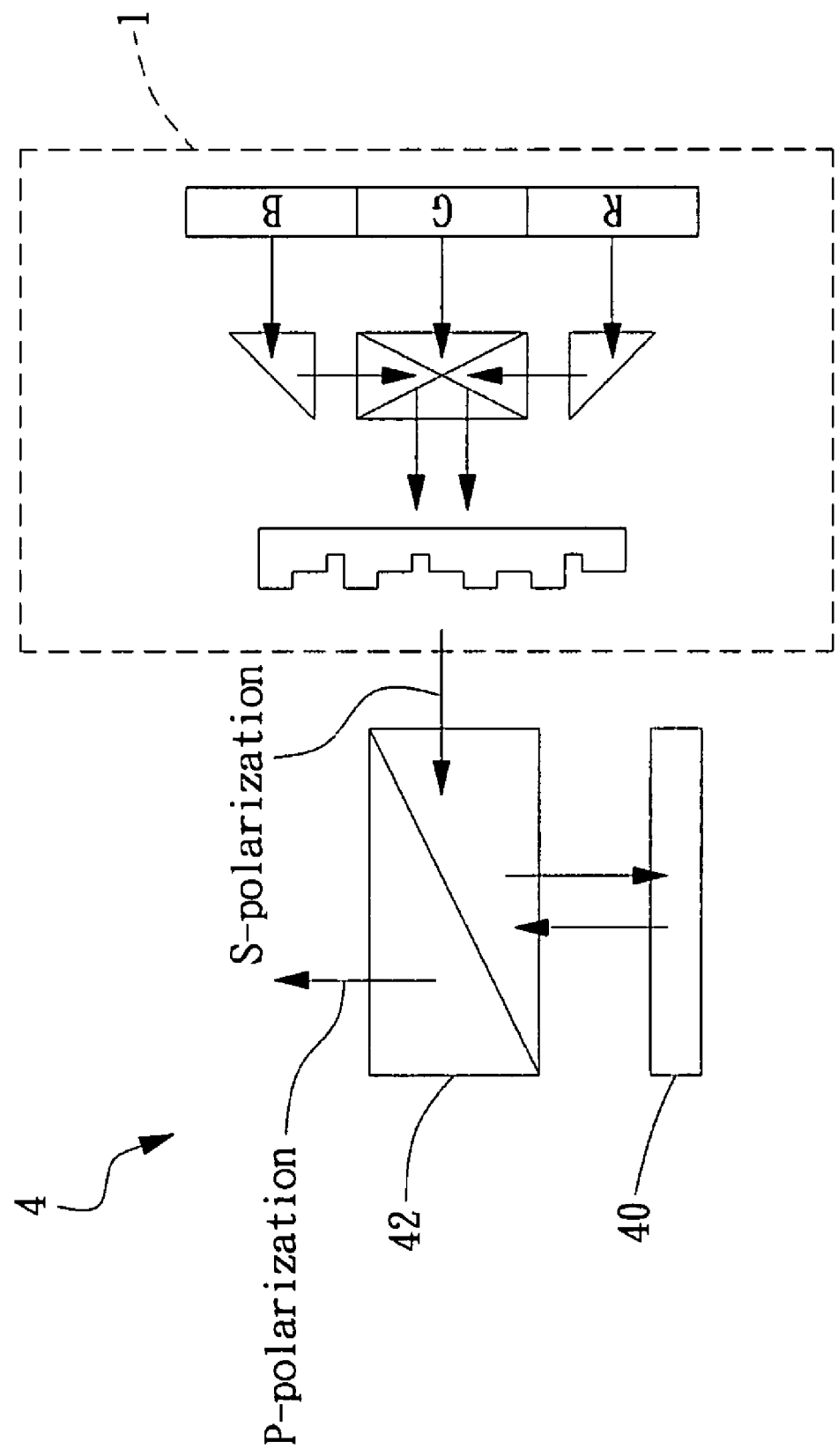
FIG. 4 shows a liquid crystal on silicon (LCoS) projection apparatus adopting a color-mixing laser module of the invention.

Please refer to FIG. 4, which shows a liquid crystal on silicon (LCoS) projection apparatus adopting a color-mixing laser module of the invention. The LCoS projection apparatus 4 also uses the aforesaid color-mixing laser module 1 as its light source, in which the laser beams of the color-mixing laser module 1 is first being reflected by a polarization beam splitter 42 to illuminate on a LCoS panel 40 where it is converted into image signals. That is, the polarizations of those laser beams are dependent upon the rotation of liquid crystal controlled by the LCoS panel 40. As seen in FIG. 4, an S-polarized incident light is reflected by the LCoS panel 40 and then is converted as a P-polarized light toward the polarization beam splitter 42 as the intended image signal. Comparing with conventional projectors, the LCoS projection apparatus 4 uses no polarizer so that the light utilization efficiency can be highly improved.

Figure 5:
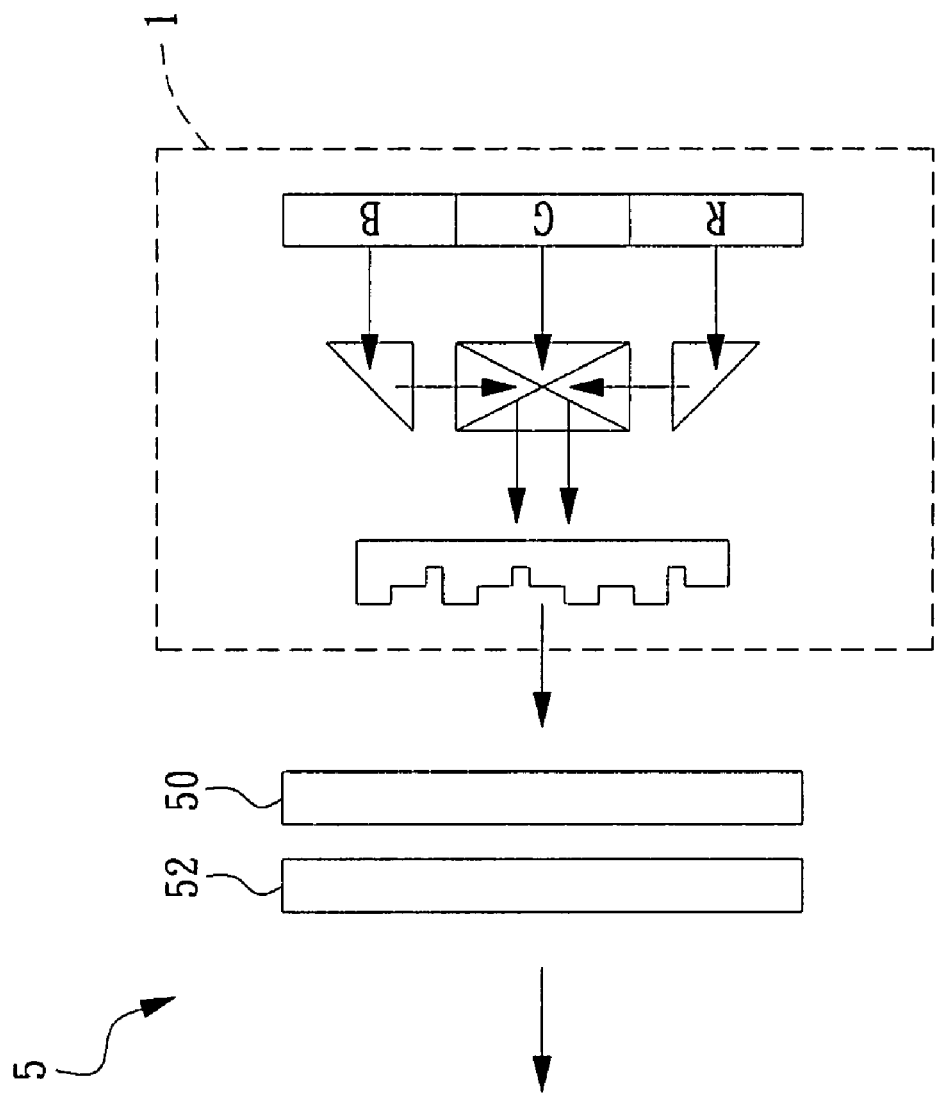
FIG. 5 shows a single-chip liquid crystal display (LCD) projection apparatus adopting a color-mixing laser module of the invention.

Please refer to FIG. 5, which shows a single-chip liquid crystal display (LCD) projection apparatus adopting a color-mixing laser module of the invention. The single-chip LCD projection apparatus 5 also uses the aforesaid color-mixing laser module 1 as its light source, in which the laser beams of the color-mixing laser module 1 is first being directed to illuminate on an LCD panel 50 where it is converted into image signals. That is, the polarizations of those laser beams are dependent upon the rotation of liquid crystal controlled by the LCD panel 50. Thereafter, the image signal is transmitting through a polarizer 52 to be displayed.

It is noted that the beam deflector can be a beam deflecting lens, or a prism. Moreover, in the color-mixing laser module, the laser unit can be structured to be composed of three laser emitters, capable of respectively emitting red, green and blue laser beams. In an exemplary embodiment of the invention, there can be three different laser units being structured in the color-mixing laser module that are used for respectively emitting red, green and blue laser beams. Those red, green and blue laser beams are directed to be received by a beam combiner where they are converged. Except for the beam combiner, the convergence of laser beams can be performed by a beam combining prism, such as X-prism or X-cube.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color-mixing laser module, comprising:
    a laser unit, capable of emitting red, blue and green laser beams;
    a beam combiner, for receiving and converging laser beams emitted from the laser unit and then redirecting the converged laser light to illuminate therefrom; and
    a light pattern adjusting unit, having a first optical surface, a second optical surface for receiving the laser beams emitted from the beam combiner, and an array of microstructures formed thereon.
    wherein, each microstructure is a pillar with arc-like profile for forming a curved surface at the top of each microstructure, provided for allowing the laser beams emitted from the beam combiner to pass therethrough.

2. The color-mixing laser module of claim 1, further comprising:
    a beam deflector, being arranged at a position between the leaser unit and the beam combiner so as to be used for guiding the laser beams emitted from the laser unit toward the beam combiner.

3. The color-mixing laser module of claim 2, wherein the beam deflector is a device selected from the group consisting of a beam deflecting lens, a prism and a reflecting lens.

4. The color-mixing laser module of claim 1, wherein the laser unit includes three laser emitters, capable of respectively emitting red, green and blue laser beams.

5. The color-mixing laser module of claim 1, wherein the beam combiner is a device selected from the group consisting of a beam combining lens and a beam combining prism.

6. The color-mixing laser module of claim 1, wherein the array of microstructures is arranged on a surface of the light pattern adjusting unit selected from the group consisting of the first optical surface, the second optical surface, and both of the aforesaid surfaces.

7. The color-mixing laser module of claim 6, wherein the center of the array of microstructures on the first optical surface is staggered from the center of the array of microstructures on the second optical surface horizontally by a specific horizontal distance while defining the specific horizontal distance to be ranged between 0 and the curvature radius of the microstructure (r).

8. A projection apparatus capable of forming an image signal on a surface, comprising:
- a color-mixing laser module, further comprising:
  - a laser unit, capable of emitting red, blue and green laser beams;
  - a beam combiner, for receiving and converging laser beams emitted from the laser unit and then redirecting the converged laser light to illuminate therefrom;
  - a light pattern adjusting unit, having a first optical surface, a second optical surface for receiving the laser beams emitted from the beam combiner, and an array of microstructures formed on the first optical surface; and
- a digital micromirror device, for receiving and converting the laser beams from the light pattern adjusting unit into the image signal; and
- a projecting unit, for receiving and amplifying the image signal and then projecting the amplified image signal upon the surface;
- wherein, each microstructure is a pillar with arc-like profile for forming a curved surface at the top of each microstructure, provided for allowing the laser beams emitted from the beam combiner to pass therethrough.

9. The projection apparatus of claim 8, wherein the color-mixing laser module further comprises a beam deflector, being arranged at a position between the Teaser unit and the beam combiner so as to be used for guiding the laser beams emitted from the laser unit toward the beam combiner.

10. The projection apparatus of claim 9, wherein the beam deflector is a device selected from the group consisting of a beam deflecting lens, a prism and a reflecting lens.

11. The projection apparatus of claim 8, wherein the laser unit includes three laser emitters, capable of respectively emitting red, green and blue laser beams.

12. The projection apparatus of claim 8, wherein the beam combiner is a device selected from the group consisting of a beam combining lens and a beam combining prism.

13. The projection apparatus of claim 8, wherein there is an array of microstructures being arranged on the second optical surface.

14. The projection apparatus of claim 13, wherein the center of the array of microstructures on the first optical surface is staggered from the center of the array of microstructures on the second optical surface horizontally by a specific horizontal distance while defining the specific horizontal distance to be ranged between 0 and the curvature radius of the microstructure (r).

15. A projection apparatus, comprising:
- a color-mixing laser module, further comprising:
  - a laser unit, capable of emitting red, blue and green laser beams;
  - a beam combiner, for receiving and converging laser beams emitted from the laser unit and then redirecting the converged laser light to illuminate therefrom; and
  - a light pattern adjusting unit, having a first optical surface, a second optical surface for receiving the laser beams emitted from the beam combiner, and an array of microstructures formed on the first optical surface;
- a polarization beam splitter, for receiving and reflecting the laser beams from the light pattern adjusting unit; and
- a liquid crystal on silicon (LCoS) panel, for receiving and converting the laser beams from the polarization beam splitter into an image signal, and then reflecting the converted imaged signal through the polarization beam splitter;
- wherein, each microstructure is a pillar with arc-like profile for forming a curved surface at the top of each microstructure, provided for allowing the laser beams emitted from the beam combiner to pass therethrough.

16. The projection apparatus of claim 15, wherein the color-mixing laser module further comprises a beam deflector, being arranged at a position between the Teaser unit and the beam combiner so as to be used for guiding the laser beams emitted from the laser unit toward the beam combiner.

17. The projection apparatus of claim 16, wherein the beam deflector is a device selected from the group consisting of a beam deflecting lens, a prism and a reflecting lens.

18. The projection apparatus of claim 15, wherein the laser unit includes three laser emitters, capable of respectively emitting red, green and blue laser beams.

19. The projection apparatus of claim 15, wherein the beam combiner is a device selected from the group consisting of a beam combining lens and a beam combining prism.

20. The projection apparatus of claim 15, wherein the polarization beam splitter is a polarization beam splitting lens.

21. The projection apparatus of claim 15, wherein there is an array of microstructures being arranged on the second optical surface.

22. The projection apparatus of claim 21, wherein the center of the array of microstructures on the first optical surface is staggered from the center of the array of microstructures on the second optical surface horizontally by a specific horizontal distance while defining the specific horizontal distance to be ranged between 0 and the curvature radius of the microstructure (r).

23. A projection apparatus, comprising:
- a color-mixing laser module, further comprising:
  - a laser unit, capable of emitting red, blue and green laser beams;
  - a beam combiner, for receiving and converging laser beams emitted from the laser unit and then redirecting the converged laser light to illuminate therefrom; and
  - a light pattern adjusting unit, having a first optical surface, a second optical surface for receiving the laser beams emitted from the beam combiner, and an array of microstructures formed on the first optical surface;
- a liquid crystal display (LCD) device, for receiving and converting the laser beams from the light pattern adjusting unit into the image signal, and then discharging the converted image signal therefrom; and
- a polarization device, for receiving the image signal while only allowing the portion of the image signal matching with the characteristics of the polarization device to pass therefrom;
- wherein, each microstructure is a pillar with arc-like profile for forming a curved surface at the top of each microstructure, provided for allowing the laser beams emitted from the beam combiner to pass therethrough.

24. The projection apparatus of claim 23, wherein the color-mixing laser module further comprises a beam deflector, being arranged at a position between the leaser unit and the beam combiner so as to be used for guiding the laser beams emitted from the laser unit toward the beam combiner.

25. The projection apparatus of claim 24, wherein the beam deflector is a device selected from the group consisting of a beam deflecting lens, a prism and a reflecting lens.

26. The projection apparatus of claim 23, wherein the laser unit includes three laser emitters, capable of respectively emitting red, green and blue laser beams.

27. The projection apparatus of claim 23, wherein the beam combiner is a device selected from the group consisting of a beam combining lens and a beam combining prism.

28. The projection apparatus of claim 23, wherein the LCD device is an LCD panel.

29. The projection apparatus of claim 23, wherein the polarization device is a polarizer.

30. The projection apparatus of claim 23, wherein there is an array of microstructures being arranged on the second optical surface.

31. The projection apparatus of claim 30, wherein the center of the array of microstructures on the first optical surface is staggered from the center of the array of microstructures on the second optical surface horizontally by a specific horizontal distance while defining the specific horizontal distance to be ranged between 0 and the curvature radius of the microstructure (r).

* * * * *